(12) United States Patent
Drexler

(10) Patent No.: US 9,382,991 B2
(45) Date of Patent: Jul. 5, 2016

(54) MULTI-DISC CLUTCH LOCK HAVING A DIFFERENTIAL HOUSING

(71) Applicant: Rainer Drexler, Buechlberg (DE)

(72) Inventor: Rainer Drexler, Buechlberg (DE)

( * ) Notice: Subject to any disclaimer, the term of this patent is extended or adjusted under 35 U.S.C. 154(b) by 45 days.

(21) Appl. No.: 14/352,112

(22) PCT Filed: Oct. 15, 2012

(86) PCT No.: PCT/DE2012/000997
§ 371 (c)(1),
(2) Date: Apr. 16, 2014

(87) PCT Pub. No.: WO2013/056691
PCT Pub. Date: Apr. 25, 2013

(65) Prior Publication Data
US 2014/0288790 A1    Sep. 25, 2014

(30) Foreign Application Priority Data

Oct. 17, 2011    (DE) .......................... 10 2011 116 027
Jul. 17, 2012    (DE) .......................... 10 2012 014 004

(51) Int. Cl.
| | |
|---|---|
| F16H 48/22 | (2006.01) |
| F16H 48/34 | (2012.01) |
| F16H 48/08 | (2006.01) |
| F16H 48/28 | (2012.01) |
| F16H 48/20 | (2012.01) |

(52) U.S. Cl.
CPC ................ *F16H 48/22* (2013.01); *F16H 48/08* (2013.01); *F16H 48/34* (2013.01); *F16H 2048/204* (2013.01); *F16H 2048/282* (2013.01); *F16H 2048/343* (2013.01)

(58) Field of Classification Search
None
See application file for complete search history.

(56) References Cited

U.S. PATENT DOCUMENTS

| | | | |
|---|---|---|---|
| 4,776,234 A | 10/1988 | Shea | |
| 5,938,556 A * | 8/1999 | Lowell | F16H 48/08 475/233 |
| 2002/0132694 A1 | 9/2002 | Okazaki | |

(Continued)

OTHER PUBLICATIONS

International Search Report of PCT/DE2012/000997, mailed Mar. 20, 2013.

*Primary Examiner* — Edwin A Young
(74) *Attorney, Agent, or Firm* — Collard & Roe, P.C.

(57) ABSTRACT

The invention relates to a multi-disc clutch lock having a differential housing in which a differential pinion between axle bevel wheels, disc sets between the axle bevel wheels and the differential housing is untwisted, but thrust rings are arranged such as to be axially movable. The multi-disc clutch lock comprises outer discs of the disc sets that are non-rotatably connected to the differential housing and inner discs that are non-rotatably connected to the axle bevel wheels. As a result, an introduced driving torque is transmitted via the differential pinion to the thrust rings in order to press the disc sets together with the axial forces produced under load on the oblique contact surface of the differential pinion. An axially movable thrust piece is arranged between at least one disc set and the differential housing in order to transmit a lifting movement initiated by an actuator to the disc set. According to a method according to the invention for operating such a multi-disc clutch lock, a multi-disc clutch lock is then applied to a disc set by an actuator, wherein the actuator is activated by a control device that has software which converts the signals coming from a vehicle CAN bus into a control signal for the actuator using a control logic.

8 Claims, 1 Drawing Sheet

(56) References Cited

U.S. PATENT DOCUMENTS

| | | | |
|---|---|---|---|
| 2003/0236147 A1* | 12/2003 | Fett | F16H 48/08 475/230 |
| 2006/0014601 A1 | 1/2006 | Kelley, Jr. | |
| 2007/0135254 A1* | 6/2007 | Okazaki | F16H 48/08 475/160 |
| 2008/0058151 A1* | 3/2008 | Curtis | F16H 48/08 475/232 |

* cited by examiner

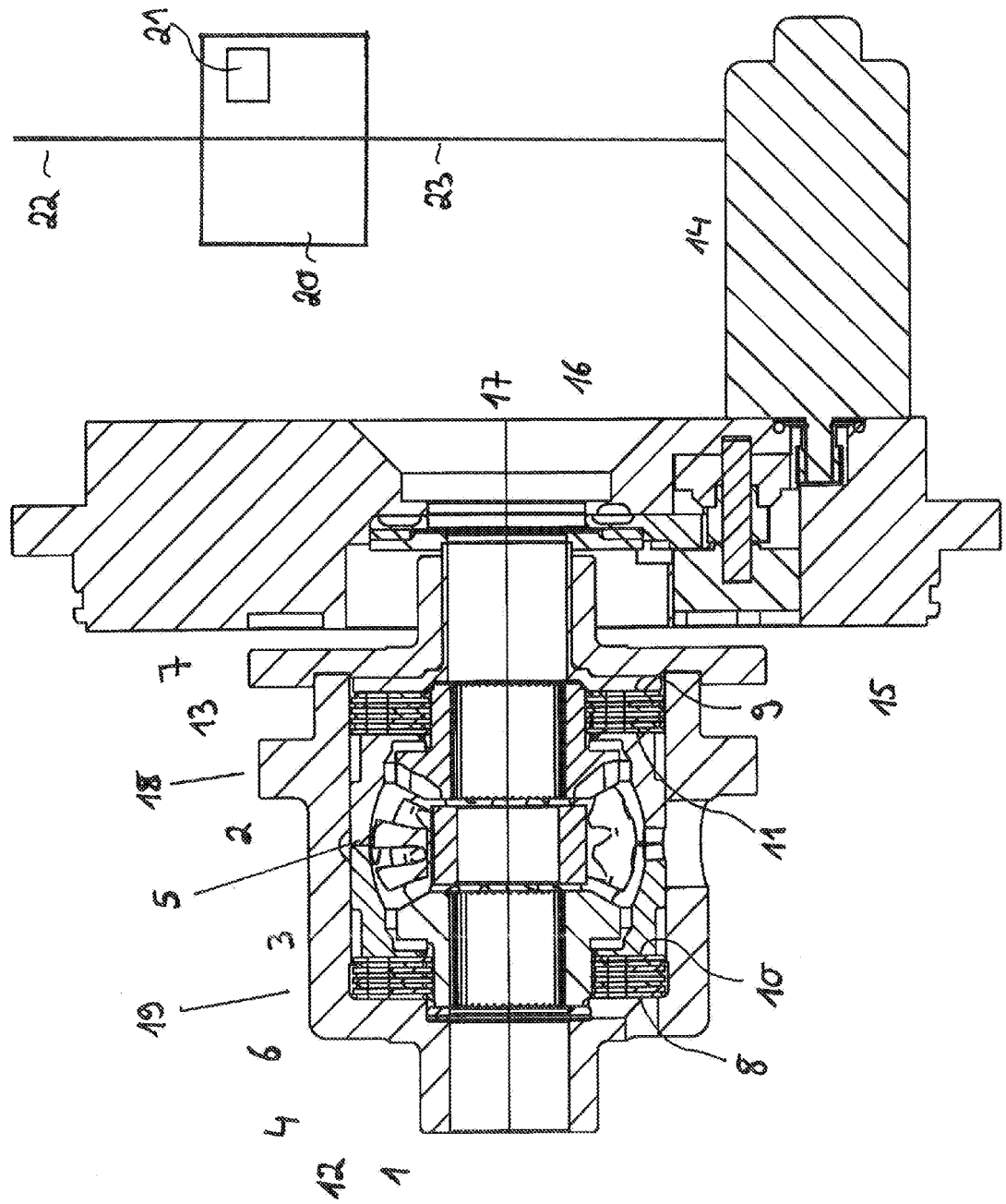

MULTI-DISC CLUTCH LOCK HAVING A DIFFERENTIAL HOUSING

CROSS REFERENCE TO RELATED APPLICATIONS

This application is the National Stage of PCT/DE2012/000997 filed on Oct. 15, 2012, which claims priority under 35 U.S.C. §119 of German Application Nos. 10 2011 116 027.6 filed on Oct. 17, 2011, and 10 2012 014 004.5 filed on Jul. 17, 2012, the disclosures of which are incorporated by reference. The international application under PCT article 21(2) was not published in English.

The invention relates to a multi-disc clutch lock with a differential housing, in which in which a differential pinion between axle bevel wheels, disc sets between the axle bevel wheels and the differential housing and non-rotatable, but axially movable guided thrust rings are arranged, wherein the outer discs of the disc set are connected in a non-rotatable manner to the differential housing and its inner discs are connected in a non-rotatable manner to the axle bevel wheels, so that a drive torque introduced via the differential pinion is transferred to the thrust rings in order to press the disc sets together with the axial forces produced under load on the oblique contact surfaces of the differential pinion. A multi-disc clutch lock of this type is also known as a self-locking differential.

Such self-locking differentials are known as Drexler® multi-disc clutch locks with a contact angle.

The invention also relates to a method of operating a multi-disc clutch lock, more particularly in the form of a Drexler® multi-disc clutch lock with a contact angle.

The aim of the invention is to further develop such multi-disc clutch locks and to present a new method of operating multi-disc clutch locks.

In accordance with the device, this aim is achieved by means of a multi-disc clutch lock with the features of claim 1.

It is of advantage if the actuator produces a rotary movement which, via an intermediate gear and a curved disc, produces the lifting movement.

The multi-disc clutch lock can have a thrust piece for transmitting the lifting movement to the disc set.

A preferred example of embodiment envisages that the multi-disc clutch lock has a control device which controls the actuator via a control signal.

Advantageously, the control device then includes software which via a control logic converts the signals coming from a vehicle CAN bus into the control signal.

The multi-disc clutch lock can have bearings which transmit the axial forces resulting from the bevel gearing of the axle bevel wheels onto the thrust rings. These bearings are preferably needle bearings.

The task upon which the invention is based is also implemented with a method in which an actuator acts on a disc set of the multi-disc clutch lock, wherein the actuator is controlled by a control device which has software that in accordance with a control logic converts the signals coming from a vehicle CAN bus into a control signal for the actuator.

One example of embodiment is shown in the drawing and will be explained in more detail below.

The only FIGURE shows a cross-section through a multi-disc clutch lock with a schematically illustrated control device.

Required load-dependent locking results from the introduced drive torque which is transmitted via the differential pinion (1) to the two thrust rings (2, 3), which are guided in the differential housing (4) in a non-rotatable by axially-movable manner. Under load, axial forces are produced on the oblique contact surfaces (5) of the differential pinion (1) on the thrust rings (2, 3) which press the disc set (6, 7) together. The outer discs (8, 9) are connected in a non-rotatable manner to the differential housing (4) and the inner discs (10, 11) are connected in a non-rotatable manner to the axle bevel wheels (12, 13).

An actuator (14) is controlled by a control device (20). The control device (20) includes software (21) which in accordance with a control logic converts the signals coming from a vehicle CAN bus (22) into a control signal (23) with which it controls the actuator (14).

Driven by the actuator (electric motor), via an intermediate gear (15) and a curved disc (16), the rotational movement of the actuator (14) is converted into an axial lifting movement.

This lifting movement is transmitted onward by a thrust piece (17) in order to apply the axial force of the axial lifting movement onto the disc set (6, 7) of a Drexler® multi-disc clutch lock with a contact angle.

In addition, the axial forces resulting from the bevel gearing of the axle bevel wheels (12, 13) are transmitted via needle bearings (18, 19) onto the thrust rings (2, 3) and in this way additional pressure is exerted on the disc sets (6, 7).

The invention claimed is:

1. Multi-disc clutch lock with a differential housing (4), in which a differential pinion (1) between axle bevel wheels (12, 13), disc sets (6, 7) between the axle bevel wheels (12, 13) and the differential housing (4) and thrust rings (2, 3) that are non-rotatable, but axially movable are arranged, wherein outer discs (8, 9) of the disc set (6, 7) are connected in a non-rotatable manner to the differential housing (4) and inner discs (10, 11) are connected in a non-rotatable manner to the axle bevel wheels (12, 13), so that a drive torque introduced via the differential housing (4) is transmitted via the thrust rings (2, 3) onto the differential pinion (1) in order to press the disc sets (6, 7) together with the axial forces produced under load on oblique contact surfaces (5) of the differential pinion (1), wherein between at least one disc set (6, 7) and the differential housing (4) an axially movable thrust piece (17) is arranged into order to transmit a lifting movement triggered by an actuator (14) onto the at least one disc set (6, 7).

2. Multi-disc clutch lock according to claim 1, wherein the actuator (14) produces a rotational movement which via an intermediate gear (15) and curved disc (16) produce the lifting movement.

3. Multi-disc clutch lock according to claim 1, comprising the thrust piece (17) for transmitting the lifting movement onto the at least one disc set (6, 7).

4. Multi-disc clutch lock according to claim 1, comprising a control device (20) which by means of a control signal (23) controls the actuator (14).

5. Multi-disc clutch lock according to claim 4, wherein the control device (20) comprises software (21) which in accordance with a control logic converts the signals coming from a vehicle CAN bus (22) into the control signal (23).

6. Multi-disc clutch lock according to claim 1, comprising bearings which transmit the axial forces resulting from the bevel gearing of the axle bevel wheels (12, 13) onto the thrust rings (2, 3).

7. Multi-disc clutch lock according to claim 6, wherein the bearings are needle bearings (18, 19).

8. Method of operating a multi-disc clutch lock, according to claim 1, comprising the steps of the actuator (14) acting on the disc set (6, 7) of the multi-disc clutch lock, and controlling the actuator (14) by a control device (20) which includes software (21) which in accordance with a control logic converts signals coming from a vehicle CAN bus (22) into a control signal (23) for the actuator (14).

\* \* \* \* \*